United States Patent
Naoi et al.

(10) Patent No.: US 8,530,110 B2
(45) Date of Patent: Sep. 10, 2013

(54) LITHIUM-ION SECONDARY BATTERY SEPARATOR AND LITHIUM-ION SECONDARY BATTERY

(75) Inventors: Katsuo Naoi, Tokyo (JP); Kenji Nishizawa, Tokyo (JP); Mitsuo Kougo, Tokyo (JP); Yoshihiko Ohashi, Tokyo (JP); Hidetake Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 672 days.

(21) Appl. No.: 12/618,979

(22) Filed: Nov. 16, 2009

(65) Prior Publication Data

US 2010/0124701 A1    May 20, 2010

(30) Foreign Application Priority Data

Nov. 19, 2008    (JP) .................... P2008-295608

(51) Int. Cl.
    *H01M 8/10*    (2006.01)
(52) U.S. Cl.
    USPC ............ 429/492; 429/481; 429/479; 429/465
(58) Field of Classification Search
    USPC ......... 429/452, 465, 479, 481–483, 491–496, 429/507–510, 535; 29/623.1–623.5; 210/500.21; 521/25–39; 428/221
    See application file for complete search history.

(56) References Cited

U.S. PATENT DOCUMENTS

| | | | | |
|---|---|---|---|---|
| 5,240,655 | A | * | 8/1993 | Troffkin et al. .............. 264/28 |
| 5,281,491 | A | * | 1/1994 | Rein et al. ................. 429/62 |
| 5,492,970 | A | * | 2/1996 | Nakakura et al. ........... 525/106 |
| 6,168,858 | B1 | * | 1/2001 | Hasegawa et al. ......... 428/315.5 |
| 6,602,593 | B1 | * | 8/2003 | Callahan et al. .......... 428/316.6 |
| 2008/0008932 | A1 | * | 1/2008 | Kasamatsu ................. 429/144 |
| 2009/0092900 | A1 | * | 4/2009 | Obana et al. .............. 429/223 |

FOREIGN PATENT DOCUMENTS

| | | | |
|---|---|---|---|
| JP | A-60-136161 | | 7/1985 |
| JP | A-63-308866 | | 12/1988 |
| JP | 2001200081 A | * | 7/2001 |
| JP | A-2002-529891 | | 9/2002 |
| JP | A-2004-227972 | | 8/2004 |
| WO | WO 00/26977 A1 | | 5/2000 |

OTHER PUBLICATIONS

Abstract in English of JP 2001-200081.*

* cited by examiner

*Primary Examiner* — Zachary Best
(74) *Attorney, Agent, or Firm* — Oliff & Berridge, PLC

(57) ABSTRACT

A lithium-ion secondary battery separator has a porous structure formed by laminating a second polymer layer, a first polymer layer, and a second polymer layer in sequence. The second polymer layer has a melting point lower than that of the first polymer layer. The second polymer layer has a higher molecular part formed on a side in contact with the first polymer layer and a lower molecular part formed on a side farther from the first polymer layer than is the higher molecular part. The higher and lower molecular parts have a weight-average molecular weight ratio (higher molecular part/lower molecular part) of 4 to 19 therebetween.

5 Claims, 7 Drawing Sheets

LITHIUM-ION SECONDARY BATTERY SEPARATOR AND LITHIUM-ION SECONDARY BATTERY

BACKGROUND OF THE INVENTION

1. Field of the Invention

The present invention relates to a lithium-ion secondary battery separator and a lithium-ion secondary battery.

2. Related Background Art

Conventionally, polyolefin-based stretched porous films and the like have been in wide use as separators for lithium-ion secondary batteries, while cellulose-based nonwovens and the like have widely been employed as separators for electrolytic capacitors and electric double-layer capacitors. These electrochemical devices are typically those of a winding type and do not require adhesion between electrodes and separators in their manufacturing process in particular.

In multilayer devices such as polymer lithium ion batteries, on the other hand, a technique in which binders for use in electrodes are thinly formed on polyolefin-based separators has been employed in order to enhance the adhesion between the electrodes and separators (see, for example, Japanese Translation of PCT International Application Laid-Open No. 2002-529891 and Japanese Patent Application Laid-Open No. 2004-227972).

In the lithium-ion secondary batteries, olefin-based polyethylene (PE) and polypropylene (PP) have been used in separators, so that the difference between their melting points is utilized for exhibiting a shutdown function, in order to enhance the safety of batteries (see, for example, Japanese Patent Application Laid-Open Nos. 60-136161 and 63-308866).

SUMMARY OF THE INVENTION

Since batteries have recently been increasing their sizes and capacities, however, it has been becoming difficult for the separators using PE and PP mentioned above to attain enough strength at high temperatures and secure sufficient safety. In large-capacity lithium-ion secondary batteries having a battery capacity of 2 Ah or greater or an electrode area of 100 mm×100 mm or larger in particular, the occurrence of internal short circuits is closely related to the heat resistance of separators, whereby separators having high heat resistance are important in suppressing short circuits in high-temperature atmospheres and improving the safety of batteries. Using a material having a high heat resistance in a separator, however, shifts the shutdown operating temperature itself to a higher temperature, thereby lowering the shutdown property, and is likely to form a thicker film since a thin film having sufficient strength with a desirably small core diameter is hard to make. It also lowers the adhesion between electrodes and separators, thereby increasing impedance.

In view of the problems of the prior art mentioned above, it is an object of the present invention to provide a lithium-ion secondary battery separator which can sufficiently lower impedance while having a shutdown property and heat resistance at the same time, and a lithium-ion secondary battery using the same.

For achieving the above-mentioned object, the present invention provides a lithium-ion secondary battery separator having a porous structure formed by laminating a second polymer layer, a first polymer layer, and a second polymer layer in sequence; wherein the second polymer layer has a melting point lower than that of the first polymer layer; wherein the second polymer layer has a higher molecular part formed on a side in contact with the first polymer layer and a lower molecular part formed on a side farther from the first polymer layer than is the higher molecular part; and wherein the higher and lower molecular parts have a weight-average molecular weight ratio (higher molecular part/lower molecular part) of 4 to 19 therebetween.

This lithium-ion secondary battery separator includes two kinds of layers, i.e., the first and second polymer layers, having melting points different from each other, thereby making it possible to secure heat resistance by using the first polymer layer (heat-resistant layer) having a higher melting point as a framework and attain a shutdown property by the second polymer layers (shutdown layers) having a lower melting point that are formed on both faces of the first polymer layer. In the separator of the present invention, the second polymer layer has higher and lower molecular parts with their weight-average molecular weight ratio falling within the range of 4 to 19 and thus can satisfy the heat resistance and shutdown property at the same time with a high level. Also, since the lower molecular part exists on the side in contact with an electrode, mechanical and electrical contacts with the electrode can be secured, whereby the impedance can sufficiently be lowered.

Preferably, in the lithium-ion secondary battery separator of the present invention, the second and first polymer layers have a film thickness ratio (second polymer layer/first polymer layer) of 0.1 to 1 therebetween. This allows the separator to secure the shutdown property and heat resistance in a better balance with a high level.

Preferably, in the lithium-ion secondary battery separator of the present invention, the melting point of the first polymer layer is 180 to 300° C. This allows the separator to attain better heat resistance.

Preferably, in the lithium-ion secondary battery separator of the present invention, the melting point of the second polymer layers is 100 to 160° C. This allows the separator to attain a better shutdown property and more fully lower the impedance.

Preferably, in the lithium-ion secondary battery separator of the present invention, the first polymer layer is a layer constituted by at least one kind of polymer material selected from the group consisting of polyacrylonitrile, polyamide-imide, polyvinyl alcohol, and thermoplastic polyimide. This allows the separator to attain better heat resistance.

Preferably, in the lithium-ion secondary battery separator of the present invention, the second polymer layer is a layer constituted by at least one kind of polymer material selected from the group consisting of polyethylene and polypropylene. This allows the separator to attain a better shutdown property and more fully lower the impedance.

The conventional separators have a shutdown range in the vicinity of 120 to 160° C. When the battery capacity is 2 Ah or more, for example, the amount of heat accumulated within a battery increases so much that the temperature within the battery may become 160° C. or higher, thus causing the separator to melt down, whereby the Joule heat generated by short-circuiting may result in a thermorunaway state. In contrast, by combining a highly heat-resistant polymer material having a higher melting point with a polymer material having a lower melting point, the separator of the present invention can raise the meltdown temperature to 180° C. or higher, while having an excellent shutdown function, thereby drastically improving the safety of the battery.

Preferably, in the lithium-ion secondary battery separator of the present invention, the weight-average molecular weight of the lower molecular part in the second polymer layer is 3000 or less. This allows the separator to attain a better shutdown property. It also permits electrodes and separators to adhere together under heat and pressure in a moderate condition of normal temperature or about 60° C. when making a cell, so as to generate favorable interfaces without collapsing fine pores, whereby the impedance can be lowered more fully.

Preferably, in the lithium-ion secondary battery separator of the present invention, the lower and higher molecular parts in the second polymer layer have a mass ratio (lower molecular part:higher molecular part) of 0.2:1.8 to 1.5:0.5 therebetween. This allows the separator to attain a better shutdown property and more fully lower the impedance.

The present invention also provides a lithium-ion secondary battery equipped with the lithium-ion secondary battery separator of the present invention. This lithium-ion secondary battery is equipped with the lithium-ion secondary battery separator of the present invention and thus can attain both the shutdown property and heat resistance and favorably form interfaces between the separator and electrodes, which makes it possible to fully lower the impedance.

As in the foregoing, the present invention can provide a lithium-ion secondary battery separator which has both the shutdown property and heat resistance while yielding favorable interface states between the separator and electrodes, thereby being able to fully lower the impedance, and a lithium-ion secondary battery using the same.

DESCRIPTION OF THE PREFERRED EMBODIMENTS

Figure 1:
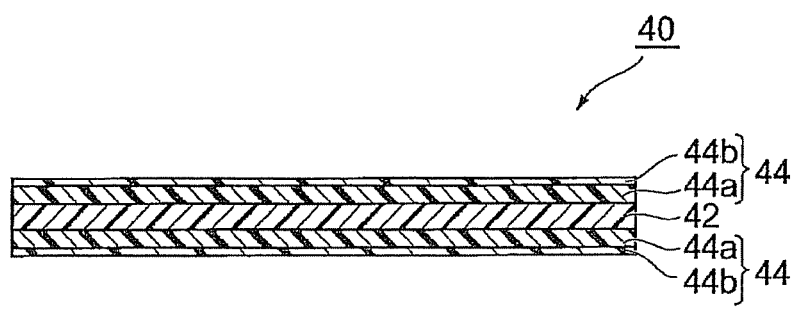
FIG. 1 is a schematic sectional view illustrating a preferred embodiment of the lithium-ion secondary battery separator in accordance with the present invention.

In the following, preferred embodiments of the present invention will be explained in detail with reference to the drawings. In the drawings, the same or equivalent parts will be referred to with the same signs while omitting their overlapping descriptions. Ratios of dimensions in the drawings are not limited to those illustrated.

Lithium-Ion Secondary Battery Separator

FIG. 1 is a schematic sectional view illustrating a preferred embodiment of the lithium-ion secondary battery separator in accordance with the present invention. As illustrated in FIG. 1, this separator 40 has a structure in which a second polymer layer 44, a first polymer layer 42, and a second polymer layer 44 are laminated in this order. The second polymer layer 44 has a melting point lower than that of the first polymer layer 42. The second polymer layer 44 has a higher molecular part 44a formed on the side in contact with the first polymer layer 42 and a lower molecular part 44b formed on the side farther from the first polymer layer 42 than is the higher molecular part 44a, while the higher molecular part 44a and lower molecular part 44b have a weight-average molecular weight ratio (higher molecular part 44a/lower molecular part 44b) of 4 to 19 therebetween.

Figure 2:
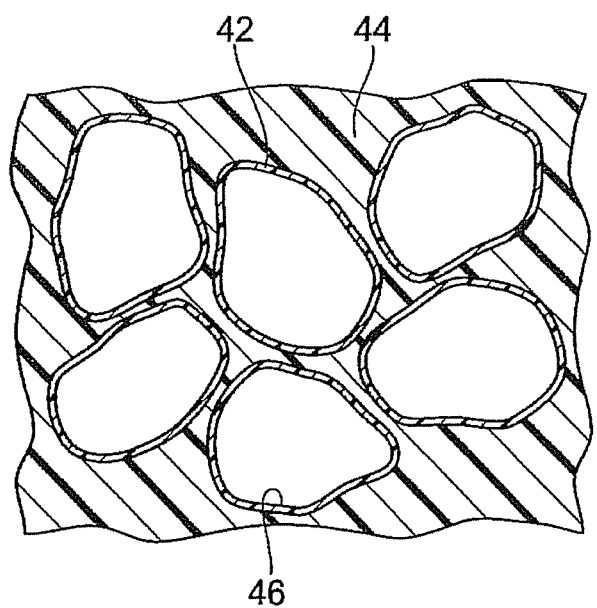
FIG. 2 is a schematic enlarged view illustrating an example of a surface of the lithium-ion secondary battery separator.
Figure 3:
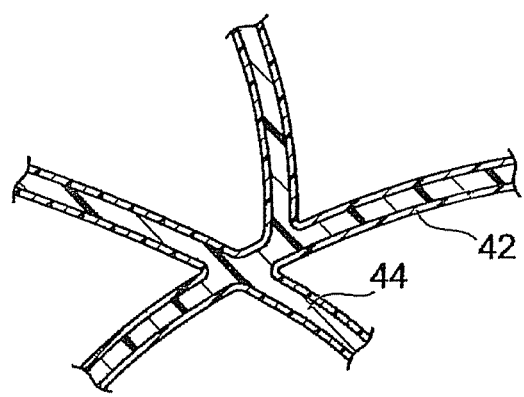
FIG. 3 is a schematic enlarged view illustrating another example of the surface of the lithium-ion secondary battery separator.

The separator 40 is a porous separator. FIG. 2 is a schematic enlarged view illustrating an example of a surface of the separator 40. FIG. 3 is a schematic enlarged view illustrating another example of the surface of the separator 40. The separator 40 may be either in a state where the second polymer layer 44 is formed on a surface of the first polymer layer 42 serving as a porous film having pores 46 as illustrated in FIG. 2, or in a state where the second polymer layer 44 is formed along fibers on the surface of a fibrous first polymer layer 42 as illustrated in FIG. 3.

The first polymer layer 42, which is a porous layer made of a polymer material, may be a layer constituted by a porous film or fibers as mentioned above. The melting point of the first polymer layer 42, which is required to be higher than that of the second polymer layer 44, is preferably 180 to 300° C., more preferably 200 to 300° C. When the melting point is lower than 180° C., the separator 40 tends to lower its heat resistance. When the melting point exceeds 300° C., the separator 40 tends to exhibit its shutdown property insufficiently, thereby lowering the safety. Polymer film materials having a melting point exceeding 300° C. also tend to yield films with higher hardness in general, thereby making it harder to form favorable interfaces with electrodes.

The material for the first polymer layer 42 is preferably a heat-resistant resin. Specific preferred examples include polyacrylonitrile (PAN), polyamide-imide (PAI), polyvinyl alcohol (PVA), and thermoplastic polyimide which can keep their forms up to high temperatures. Among them, polyacrylonitrile is preferred in particular from the viewpoints of lowering the adsorption coefficient for moistures which may deteriorate battery characteristics and keeping the elasticity of the film.

The second polymer layers 44 are formed on both faces of the first polymer layer 42. The melting point of the second polymer layer 44, which is required to be lower than that of the first polymer layer 42, is preferably 100 to 160° C., more preferably 100 to 140° C. When the melting point is lower than 100° C., the reliability tends to decrease at high temperatures. When the melting point exceeds 160° C., there is a tendency to increase the impedance and decrease the shutdown property.

Preferred as a material for the second polymer layers 44 is a material having a low melting point. Specific preferred examples include polyethylene (PE) and polypropylene (PP). From the viewpoint of forming a favorable interface between the separator and an electrode at such a low temperature as to keep fine pore diameters from collapsing, it is preferred in particular to use one of polyethylene and polypropylene alone or both of them in combination.

The second polymer layer 44 has the higher molecular part 44a formed on the side in contact with the first polymer layer 42 and the lower molecular part 44b formed on the side farther from the first polymer layer 42 than is the higher molecular part 44a, while the higher molecular part 44a and lower molecular part 44b have a weight-average molecular weight ratio (higher molecular part 44a/lower molecular part 44b) of 4 to 19 therebetween. The weight-average molecular weight ratio (higher molecular part 44a/lower molecular part 44b) is more preferably 7 to 19. The lower molecular part 44b is correlated with the adhesion to electrodes, while the higher molecular part 44a has a strong correlation with the shutdown property. In particular, when their interfacial molecular weight ratio is small, the difference between their melting points may be so small that fine core diameters are likely to collapse at the time of forming interfaces with electrodes, whereby the impedance tends to increase. When the interfacial molecular weight ratio is large, the shutdown operating temperature becomes discontinuous, whereby sufficient results are harder to achieve. Hence, when the weight-average molecular weight ratio is less than 4 or more than 19, it cannot sufficiently attain the heat resistance and shutdown property at the same time and lower the impedance.

In the second polymer layer 44, the weight-average molecular weight of the lower molecular part 44b is preferably 3000 or less, more preferably 500 to 3000. When the weight-average molecular weight exceeds 3000, the separator 40 tends to lower its shutdown property and increase the impedance.

In the second polymer layer 44, the mass ratio between the lower molecular part 44b and higher molecular part 44a (the mass of the lower molecular part 44b:the mass of the higher molecular part 44a) is preferably 0.2:1.8 to 1.5:0.5. When the mass of the lower molecular part 44b is less than 0.2 in the case where the mass of the higher molecular part 44a is 1.8, there is a tendency to increase the impedance and decrease the shutdown function. When the mass of the lower molecular part 44b is more than 1.5 in the case where the mass of the higher molecular part 44a is 0.5, the impedance tends to increase. Hence, each of the above tends to make it difficult to fully improve the heat resistance, shutdown property, and impedance characteristic of the separator 40 at the same time. The mass ratio between the lower molecular part 44b and higher molecular part 44a can be adjusted by changing the amount of application (applied film thickness) of the lower molecular part 44b and the amount of application (applied film thickness) of the higher molecular part 44a.

The separator 40 of the present invention can adjust its shutdown temperature by regulating the melting point and material of the second polymer layer 44, the weight-average molecular weight ratio and mass ratio between the higher molecular part 44a and lower molecular part 44b, the weight-average molecular weight of the lower molecular part 44b, and the like.

In the present invention, the weight-average molecular weights of the higher molecular part 44a and lower molecular part 44b are measured by viscometry or liquid chromatography. The masses of the higher molecular part 44a and lower molecular part 44b are measured by a DSC analysis. Here, a heating speed of 5° C./min within the range from room temperature to 300° C. is employed as a measurement condition in the DSC analysis, whereby the difference in masses of the higher molecular part 44a and lower molecular part 44b can be measured while clearly separating them from each other.

While the second polymer layers 44 are formed on both faces of the first polymer layer 42, it will be preferred if the second polymer layer 44 formed on one face of the first polymer layer 42 and the second polymer layer 44 formed on the other face of the first polymer layer 42 have substantially the same structure. Therefore, it will be preferred if both of the second polymer layers 44 satisfy the preferred conditions of the second polymer layer 44 mentioned above.

In the separator 40, the film thickness ratio between the second polymer layer 44 and first polymer layer 42 (second polymer layer 44/first polymer layer 42) is preferably 0.1 to 1, more preferably 0.2 to 1. The shutdown property of the separator 40 tends to decrease when the film thickness ratio is less than 0.1, while the impedance tends to increase when the film thickness ratio exceeds 1.

In the separator 40, the content of the first polymer layer 42 is preferably 10 to 50% by mass, more preferably 20 to 30% by mass, based on the total amount of the separator 40. The mechanical strength and heat resistance of the separator 40 tend to decrease when the content is less than 10% by mass, while the shutdown function of the separator 40 tends to decrease when the content exceeds 50% by mass.

The separator 40 can be made by coating the polymer material constituting the first polymer layer 42 with a low-melting-point polymer constituting the second polymer layer 44. More specifically, the second polymer layer 44 can be formed by electrospinning, for example.

The higher molecular part 44a and lower molecular part 44b in the second polymer layer 44 can be formed, for example, by a method comprising applying onto the first polymer layer 42 a predetermined amount of a higher molecular Hi-WAX while heating it to melt with a spray nozzle, drying it, then similarly applying a predetermined amount of a lower molecular Hi-WAX thereto while heating it to melt with a spray nozzle, and drying it, or a method comprising mixing a higher molecular wax emulsion solution and a lower molecular wax emulsion solution in a predetermined ratio, applying a predetermined amount of the resulting mixture with a spray nozzle, and drying it.

Lithium-Ion Secondary Battery

Figure 4:
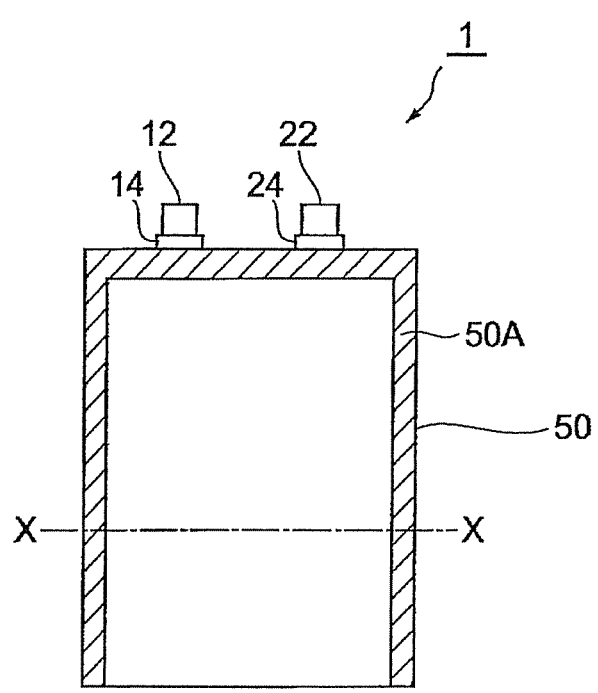
FIG. 4 is a front view illustrating a preferred embodiment of the lithium-ion secondary battery in accordance with the present invention.
Figure 5:
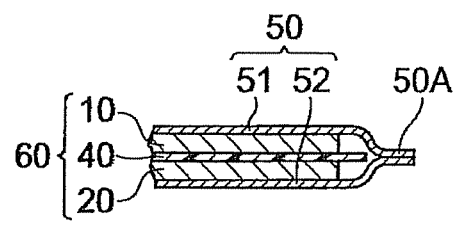
FIG. 5 is a schematic sectional view of the lithium-ion secondary battery taken along the line X-X of FIG. 4.

FIG. 4 is a front view illustrating a preferred embodiment of the lithium-ion secondary battery in accordance with the present invention. FIG. 5 is a schematic view of a cross section of the lithium-ion secondary battery 1 cut along the line X-X of FIG. 4.

As illustrated in FIGS. 4 and 5, the lithium-ion secondary battery 1 is mainly constituted by a power generating element 60 comprising a planar negative electrode 10 and a planar positive electrode 20 which oppose each other and a planar separator 40 arranged between and adjacent to the negative electrode 10 and positive electrode 20, an electrolytic solution (nonaqueous electrolytic solution in this embodiment) containing lithium ions, a case 50 accommodating them in a closed state, a negative electrode lead 12 having one end part electrically connected to the negative electrode 10 and the other end part projecting out of the case 50, and a positive electrode lead 22 having one end part electrically connected to the positive electrode 20 and the other end part projecting out of the case 50. For the separator 40, that of the present invention mentioned above is used.

In this specification, the "negative electrode", which is based on the polarity of the battery at the time of discharging, refers to an electrode which releases electrons by an oxidation reaction at the time of discharging. The "positive electrode", which is based on the polarity of the battery at the time of discharging, refers to an electrode which receives electrons by a reduction reaction at the time of discharging.

Figure 6:
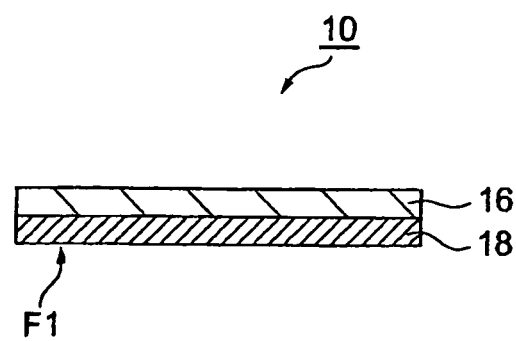
FIG. 6 is a schematic sectional view illustrating an example of basic structures of a negative electrode in the lithium-ion secondary battery.
Figure 7:
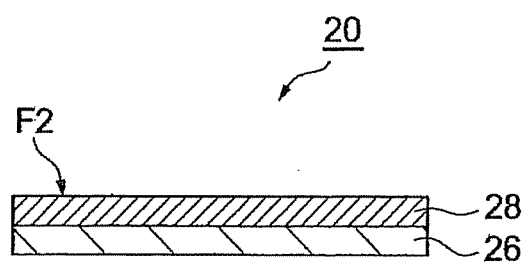
FIG. 7 is a schematic sectional view illustrating an example of basic structures of a positive electrode in the lithium-ion secondary battery.

FIG. 6 is a schematic sectional view illustrating an example of basic structures of the negative electrode 10 in the lithium-ion secondary battery 1. FIG. 7 is a schematic sectional view illustrating an example of basic structures of the positive electrode 20 in the lithium-ion secondary battery 1.

As illustrated in FIG. 6, the negative electrode 10 is constituted by a current collector 16 and a negative electrode active material layer 18 formed on the current collector 16. As illustrated in FIG. 7, the positive electrode 20 is constituted by a current collector 26 and a positive electrode active material layer 28 formed on the current collector 26.

The current collectors 16, 26 are not limited in particular as long as they are good conductors which can sufficiently transfer electric charges to the negative and positive electrode active material layers 18, 28, respectively; known current collectors employed in lithium-ion secondary batteries can be used. Examples of the current collectors 16, 26 include metal foils made of copper and aluminum, respectively.

The negative electrode active material layer 18 of the negative electrode 10 is mainly constituted by a negative electrode active material and a binder. Preferably, the negative electrode active material layer 18 further contains a conductive auxiliary.

The negative electrode active material is not limited in particular as long as it allows occlusion and release of lithium ions, desorption and insertion (intercalation) of lithium ions, or doping and undoping of lithium ions and their counteranions (e.g., $PF_6^-$ and $ClO_4^-$) to proceed reversibly; known negative electrode active materials can be used. Examples of the negative electrode active material include carbon materials such as natural graphite, synthetic graphite, non-graphitizing carbon, graphitizable carbon, and low-temperature-firable carbon; metals such as Al, Si, and Sn which are combinable with lithium; amorphous compounds mainly composed of oxides such as SiO, $SiO_2$, $SiO_x$, and $SnO_2$; lithium titanate ($Li_4Ti_5O_{12}$); and $TiO_2$.

As the binder used in the negative electrode 10, known binders can be employed without any restrictions in particular. Examples include fluororesins such as polyvinylidene fluoride (PVDF), polytetrafluoroethylene (PTFE), tetrafluoroethylene/hexafluoropropylene copolymers (FEP), tertrafluoroethylene/perfluoroalkylvinyl ether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF). The binder not only binds constituent materials such as active material particles, the conductive auxiliary added when necessary, and the like together, but also contributes to binding these constituent materials to the current collector.

Other examples of the binder include fluorine rubbers based on vinylidene fluoride such as fluorine rubbers based on vinylidene fluoride/hexafluoropropylene (VDF/HFP-based fluorine rubbers).

Still other examples of the binder include polyethylene, polypropylene, polyethylene terephthalate, aromatic polyamides, cellulose, styrene/butadiene rubber, isoprene rubber, butadiene rubber, and ethylene/propylene rubber. Also employable are thermoplastic elastomeric polymers such as styrene/butadiene/styrene block copolymers and hydrogenated derivatives thereof, styrene/ethylene/butadiene/styrene copolymers, and styrene/isoprene/styrene block copolymers and hydrogenated derivatives thereof. Further employable are syndiotactic 1,2-polybutadiene, ethylene/vinyl acetate copolymers, propylene-α-olefin (having a carbon number of 2 to 12) copolymers, and the like. Conductive polymers may also be used.

As the conductive auxiliary used when necessary, known conductive auxiliaries can be employed without any restrictions in particular. Examples include carbon blacks, carbon materials, fine powders of metals such as copper, nickel, stainless steel, and iron, mixtures of the carbon materials and fine metal powders, and conductive oxides such as ITO.

The content of the negative electrode active material in the negative electrode active material layer 18 is preferably 80 to 97% by mass, more preferably 85 to 96% by mass, based on the total amount of the negative electrode active material layer 18. When the active material content is less than 80% by mass, the energy density tends to become lower than that in the case where the content falls within the range mentioned above. When the active material content exceeds 97% by mass, the bonding force tends to become weaker, thereby lowering the cycle characteristic as compared with the case where the content falls within the range mentioned above.

The positive electrode active material layer 28 of the positive electrode 20 is mainly constituted by a positive electrode active material and a binder. Preferably, the positive electrode active material layer 28 further contains a conductive auxiliary.

The positive electrode active material is not limited in particular as long as it allows occlusion and release of lithium ions, desorption and insertion (intercalation) of lithium ions, or doping and undoping of lithium ions and their counteranions (e.g., $ClO_4^-$) to proceed reversibly; known positive electrode active materials can be used. Examples of the positive electrode active material include lithium cobaltate ($LiCoO_2$), lithium nickelate ($LiNiO_2$), lithium manganese spinel ($LiMn_2O_4$), mixed metal oxides expressed by the general formula of $LiNi_xCo_yMn_zM_aO_2$ (where $x+y+z+a=1$, $0 \leq x \leq 1$, $0 \leq y \leq 1$, $0 \leq z \leq 1$, $0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn, Fe, Mg, Nb, Ti, Al, and Zr, or VO), and mixed metal oxides such as lithium titanate ($Li_4Ti_5O_{12}$).

As the binder used in the positive electrode 20, one similar to the binder used in the negative electrode 10 can be employed. As the conductive auxiliary used in the positive electrode 20 when necessary, one similar to the conductive auxiliary used in the negative electrode 10 can be employed.

The current collector 26 of the positive electrode 20 is electrically connected to one end of the positive electrode lead 22 made of aluminum, for example, while the other end of the positive electrode lead 22 extends to the outside of the case 50. On the other hand, the current collector 16 of the negative electrode 10 is electrically connected to one end of the negative electrode lead 12 made of copper or nickel, for example, while the other end of the negative electrode lead 12 extends to the outside of the case 50.

The part of the negative electrode lead 12 in contact with a seal part 50A is covered with an insulator 14 for preventing the negative electrode lead 12 from coming into contact with a metal layer of the case 50. The part of the positive electrode lead 22 in contact with the seal part 50A is covered with an insulator 24 for preventing the positive electrode lead 22 from coming into contact with the metal layer of the case 50. The insulators 14, 24 also serve to improve the adhesion between the innermost layer of the case 50 and the leads 12, 22.

The separator 40 arranged between the negative electrode 10 and positive electrode 20 is formed by a porous body having ion permeability and electronic insulativeness. As the separator 40, that of the present invention mentioned above is used.

The electrolytic solution (not depicted) fills the inner space of the case 50, while being partly contained within the negative electrode 10, positive electrode 20, and separator 40. As the electrolytic solution, a nonaqueous electrolytic solution in which a lithium salt is dissolved in an organic solvent is used. Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used either singly or in combinations of two or more. The electrolytic solution may be gelled by addition of polymers and the like thereto.

As the organic solvent, one used in known lithium-ion secondary batteries can be employed. Preferred examples include propylene carbonate, ethylene carbonate, and diethyl carbonate. They may be used either singly or in mixtures of two or more at any ratios.

As illustrated in FIG. 5, the case 50 is formed by a pair of opposing films (first and second films 51, 52). Edge parts of films opposing and overlapping each other are sealed with an adhesive or by heat-sealing, so as to form the seal part 50A.

The film constituting the first and second films 51, 52 is a flexible film. Though this film is not limited in particular as long as it is a flexible film, it preferably has at least an innermost layer made of a polymer in contact with the power generating element 60 and a metal layer arranged on the side of the innermost layer opposite from the side in contact with the power generating element from the viewpoint of effectively preventing moisture and air from entering the inside of the case 50 from the outside and electrolyte components from dissipating from the inside to the outside of the case 50, while securing sufficient mechanical strength and lightweight of the case.

A method of manufacturing the above-mentioned lithium-ion secondary battery 1 will now be explained.

For making the power generating element 60 (multilayer body in which the negative electrode 10, separator 40, and positive electrode 20 are sequentially laminated in this order), known methods employed for manufacturing lithium-ion secondary batteries can be used without any restrictions in particular.

First, when making the negative and positive electrodes 10, 20, the constituents mentioned above are mixed and dispersed into a solvent in which the binder is soluble, so as to produce an electrode forming coating liquid (slurry, paste, or the like). The solvent is not limited in particular as long as the binder is soluble therein; examples include N-Methyl-2-pyrrolidone and N,N-dimethylformamide.

Subsequently, the electrode forming coating liquid is applied onto a current collector surface, dried, and extended, so as to form an active material containing layer on the current collector, thereby completing the making of the negative and positive electrodes 10, 20. The technique for applying the electrode forming coating liquid to the current collector surface is not limited in particular, but may be determined as appropriate according to the material, form, and the like of the current collector. Examples of the coating method include metal mask printing, electrostatic coating, dip coating, spray coating, roll coating, doctor blading, gravure coating, and screen printing.

Thereafter, the negative and positive leads 12, 22 are electrically connected to thus prepared negative and positive electrodes 10, 20, respectively.

Subsequently, the separator 40 is arranged between and in contact with the negative electrode 10 and positive electrode 20 (preferably in an unbonded state), so as to complete the power generating element 60. Here, a surface F1 of the negative electrode 10 facing the negative electrode active material layer 18 and a surface F2 of the positive electrode 20 facing the positive electrode active material layer 28 are arranged in contact with the separator 40.

Next, the edge parts of the first and second films 51, 52 overlaid on each other are sealed with an adhesive or by heat sealing, so as to make the case 50. Here, for securing an opening for introducing the power generating element 60 into the case 50 in a later step, a part of the edge parts is left unsealed. This yields the case 50 having the opening.

Subsequently, the power generating element 60 having the negative and positive electrode leads 12, 22 electrically connected thereto is inserted into the case 50 having the opening, and the electrolytic solution is injected therein. Then, while the negative and positive electrodes 12, 22 are partly inserted in the case 50, the opening of the case 50 is sealed, whereby the lithium-ion secondary battery 1 is completed.

Though a preferred embodiment of the present invention is explained in the foregoing, the present invention is not limited thereto.

For example, though the above-mentioned embodiment explains the lithium-ion secondary battery 1 comprising one each of the negative and positive electrodes 10, 20, two or more each of the negative and positive electrodes 10, 20 may be provided while always arranging one separator 40 between each pair of the negative and positive electrodes 10, 20. The lithium-ion secondary battery 1 is not limited to the form illustrated in FIG. 4, but may have a cylindrical form, for example.

The lithium-ion secondary battery of the present invention can also be used for power supplies for self-propelled micro-machines, IC cards, and the like and decentralized power supplies placed on or within printed boards.

EXAMPLES

The present invention will be explained more specifically with reference to examples and comparative examples. However, the present invention is not limited to the following examples.

Example 1

A high-molecular Hi-WAX of polypropylene (PP) (model number: NP055, manufactured by Mitsui Chemicals, Inc., having a weight-average molecular weight of 7000) was applied to both faces of a porous film (having a melting point of 230° C., a thickness of 20 μm, a density of 3.8 g/m$^2$, and a porosity of 80%) made of polyacrylonitrile (PAN) acting as a first polymer layer with a spray nozzle while being heated to melt and then dried. Thereafter, a low-molecular Hi-WAX of PE (model number: 110P, manufactured by Mitsui Chemicals, Inc., having a weight-average molecular weight of 1000) was applied to the resulting layers while being heated to melt and then dried. This formed second polymer layers each having a higher molecular part formed on the first polymer layer and a lower molecular part formed on the higher molecular part. Here, their applied amounts were adjusted such that the mass ratio of the lower molecular part to the higher molecular part was 0.5:1.5. The foregoing yielded a separator having a structure in which the second polymer layer made of PE and PP, the first polymer layer made of PAN, and the second polymer layer made of PE and PP were laminated in this order. Each of the second polymer layers had a thickness of 4 μm and a melting point of 140° C. In each of the second polymer layers, the weight-average molecular weight ratio between the higher and lower molecular part (higher molecular part/lower molecular part) was 7.

Examples 2 to 19

Separators of Examples 2 to 19 were obtained as in Example 1 except that the thickness of the first polymer layer and the thickness, material, and coating time of the second polymer layer were changed such that the thickness ratio between the first and second polymer layers and the weight-average molecular weight ratio and mass ratio between the higher and lower molecular parts in the second polymer layer were as listed in the following Table 1.

Comparative Example 1

An isopropanol solution containing nanofibers (having an average fiber diameter of 70 nm) of polyacrylonitrile (PAN)

dispersed therein was applied by dip coating to both faces of a porous film made of polyethylene (PE) (having a melting point of 120° C., a weight-average molecular weight of 10000, and a thickness of 20 μm) as a first polymer layer and then dried, so as to form second polymer layers. This yielded a separator having a structure in which the second polymer layer made of PAN, the first polymer layer made of PE, and the second polymer layer made of PAN were laminated in this order. Each of the second polymer layers had a thickness of 4 μm and a melting point of 230° C.

Comparative Examples 2 and 3

Separators of Comparative Examples 2 and 3 were obtained as in Example 1 except that the material for the second polymer layer was changed, so as to adjust the weight-average molecular weight ratio between the higher and lower molecular parts in the second polymer layer as listed in the following Table 1.

Comparative Example 4

The separator of Comparative Example 4 was obtained as in Example 1 except that each second polymer layer was formed by only a higher molecular part constituted by PP.

Comparative Example 5

The separator of Comparative Example 5 was obtained as in Example 1 except that each second polymer layer was formed by only a lower molecular part constituted by PE.

TABLE 1

| | 1st polymer layer | | | 2nd polymer layer | | | Thickness ratio (2nd polymer layer/1st polymer layer) | Lower molecular part | | | Higher molecular part | | | Molecular weight ratio (higher molecular part/lower molecular part) | Mass ratio (lower molecular part:higher molecular part) |
|---|---|---|---|---|---|---|---|---|---|---|---|---|---|---|---|
| | Composition | MP [°C.] | Thickness [μm] | Composition | MP [°C.] | Thickness [μm] | | Material | Composition | Mw | Material | Composition | Mw | | |
| Example 1 | PAN | 230 | 20 | PE/PP | 140 | 4 | 0.2 | 110P | PE | 1000 | NP055 | PP | 7000 | 7 | 0.5:1.5 |
| Example 2 | PAN | 230 | 20 | PE/PP | 140 | 4 | 0.2 | 110P | PE | 1000 | NP505 | PP | 19000 | 19 | 0.5:1.5 |
| Example 3 | PAN | 230 | 20 | PE | 120 | 4 | 0.2 | 110P | PE | 1000 | 410P | PE | 4000 | 4 | 0.5:1.5 |
| Example 4 | PAN | 230 | 20 | PE | 120 | 4 | 0.2 | 110P | PE | 1000 | 720P | PE | 7200 | 7 | 0.5:1.5 |
| Example 5 | PAN | 230 | 10 | PE/PP | 140 | 0.5 | 0.05 | 110P | PE | 1000 | NP055 | PP | 7000 | 7 | 0.5:1.5 |
| Example 6 | PAN | 230 | 20 | PE/PP | 140 | 1 | 0.05 | 110P | PE | 1000 | NP055 | PP | 7000 | 7 | 0.5:1.5 |
| Example 7 | PAN | 230 | 10 | PE/PP | 140 | 1 | 0.1 | 110P | PE | 1000 | NP055 | PP | 7000 | 7 | 0.5:1.5 |
| Example 8 | PAN | 230 | 20 | PE/PP | 140 | 2 | 0.1 | 110P | PE | 1000 | NP055 | PP | 7000 | 7 | 0.5:1.5 |
| Example 9 | PAN | 230 | 20 | PE/PP | 140 | 4 | 0.2 | 110P | PE | 1000 | NP055 | PP | 7000 | 7 | 0.5:1.5 |
| Example 10 | PAN | 230 | 20 | PE/PP | 140 | 10 | 0.5 | 110P | PE | 1000 | NP055 | PP | 7000 | 7 | 0.5:1.5 |
| Example 11 | PAN | 230 | 20 | PE/PP | 140 | 20 | 1 | 110P | PE | 1000 | NP055 | PP | 7000 | 7 | 0.5:1.5 |
| Example 12 | PAN | 230 | 10 | PE/PP | 140 | 10 | 1 | 110P | PE | 1000 | NP055 | PP | 7000 | 7 | 0.5:1.5 |
| Example 13 | PAN | 230 | 20 | PE/PP | 140 | 21 | 1.05 | 110P | PE | 1000 | NP055 | PP | 7000 | 7 | 0.5:1.5 |
| Example 14 | PAN | 230 | 10 | PE/PP | 140 | 11 | 1.1 | 110P | PE | 1000 | NP055 | PP | 7000 | 7 | 0.5:1.5 |
| Example 15 | PAN | 230 | 20 | PE/PP | 140 | 4 | 0.2 | 110P | PE | 1000 | NP055 | PP | 7000 | 7 | 0.2:1.8 |
| Example 16 | PAN | 230 | 20 | PE/PP | 140 | 4 | 0.2 | 110P | PE | 1000 | NP055 | PP | 7000 | 7 | 0.3:1.7 |
| Example 17 | PAN | 230 | 20 | PE/PP | 140 | 4 | 0.2 | 110P | PE | 1000 | NP055 | PP | 7000 | 7 | 1:1 |
| Example 18 | PAN | 230 | 20 | PE/PP | 140 | 4 | 0.2 | 110P | PE | 1000 | | | | | |
| Example 19 | PAN | 230 | 20 | PE/PP | 140 | 4 | 0.2 | 110P | PE | 1000 | | | | | |
| Comp. Ex. 1 | PE | 120 | 20 | PAN | 230 | 4 | 0.2 | — | — | — | | | | | |
| Comp. Ex. 2 | PAN | 230 | 20 | PE | 120 | 4 | 0.2 | 110P | PE | 1000 | | | | | |
| Comp. Ex. 3 | PAN | 230 | 20 | PE/PP | 140 | 4 | 0.2 | 110P | PE | 1000 | | | | | |
| Comp. Ex. 4 | PAN | 230 | 20 | PP | 140 | 4 | 0.2 | — | — | — | | | | | |
| Comp. Ex. 5 | PAN | 230 | 20 | PE | 120 | 4 | 0.2 | 110P | PE | 1000 | | | | | |

TABLE 1-continued

|  | | | | | |
|---|---|---|---|---|---|
| Example 18 | NP055 | PP | 7000 | 7 | 1.4:0.6 |
| Example 19 | NP055 | PP | 7000 | 7 | 1.5:0.5 |
| Comp. Ex. 1 | — | — | — | — | — |
| Comp. Ex. 2 | 320P | PE | 3000 | 3 | 0.5:1.5 |
| Comp. Ex. 3 | NP805 | PP | 29000 | 29 | 0.5:1.5 |
| Comp. Ex. 4 | NP055 | PP | 7000 | 7 | — |
| Comp. Ex. 5 | — | — | — | 7 | — |

Details of materials used for the lower and higher molecular parts in Table 1 are as follows:

110P (model number): a Hi-WAX of polyethylene (PE), manufactured by Mitsui Chemicals, Inc., having a weight-average molecular weight of 1000

NP055 (model number): a Hi-WAX of polypropylene (PP), manufactured by Mitsui Chemicals, Inc., having a weight-average molecular weight of 7000

NP505 (model number): a Hi-WAX of polypropylene (PP), manufactured by Mitsui Chemicals, Inc., having a weight-average molecular weight of 19000

410P (model number): a Hi-WAX of polyethylene (PE), manufactured by Mitsui Chemicals, Inc., having a weight-average molecular weight of 4000

720P (model number): a Hi-WAX of polyethylene (PE), manufactured by Mitsui Chemicals, Inc., having a weight-average molecular weight of 7200

320P (model number): a Hi-WAX of polyethylene (PE), manufactured by Mitsui Chemicals, Inc., having a weight-average molecular weight of 3000

NP805 (model number): a Hi-WAX of polypropylene (PP), manufactured by Mitsui Chemicals, Inc., having a weight-average molecular weight of 29000

Making of Evaluation Cell

Preparation of a Positive Electrode Coating Material

An active material particle made of lithium cobaltate ($LiCoO_2$) (product name: Selion manufactured by Seimi Chemical Co., Ltd.), PVDF as a binder, and carbon black (product name: DAB manufactured by Denki Kagaku Kogyo K.K.) as a conductive auxiliary were dispersed in NMP, so as to prepare a positive electrode coating material.

Preparation of a Negative Electrode Coating Material

An active material particle made of OMAC (product name; manufactured by Osaka Gas Co., Ltd.), PVDF as a binder, and carbon black (product name: DAB manufactured by Denki Kagaku Kogyo K.K.) as a conductive auxiliary were dispersed in NMP, so as to prepare a negative electrode coating material.

Making of a Positive Electrode

The positive electrode coating material was applied to a surface of a sheet-like current collector made of aluminum, so as to form a positive electrode coating film. The amount of the positive electrode coating material applied to the current collector was adjusted such that the mass of the active material particle carried by the current collector per unit area was 10.0 mg/cm$^2$. Thereafter, thus obtained product was extended at a processing linear pressure of 300 kgf/cm, so as to form a positive electrode roll, which was then punched out into a piece having a length of 100 mm and a width of 142 mm with a blanking die, so as to yield a positive electrode.

Making of a Negative Electrode

A negative electrode was formed by the same method as with the positive electrode except that the negative electrode coating material was used, that the processing linear pressure was 150 kgf/cm, and that the punched-out piece had a length of 102 mm and a width of 144 mm.

Making of a Lithium-Ion Secondary Battery

Respective leads were electrically connected to the positive and negative electrodes, and each of the separators made as mentioned above was arranged between and in contact with the negative and positive electrodes, so as to form a power generating element. Here, the positive and negative electrode active material layers were arranged so as to be in contact with the separator.

Next, the power generating element was inserted into a case of a battery, and an electrolytic solution was injected therein. Employed as the electrolytic solution was one in which $LiPF_6$ was dissolved at a concentration of 1.5 M in a mixed solvent of PC (propylene carbonate), EC (ethylene carbonate), and DEC (diethyl carbonate) (in a PC:EC:DEC volume ratio of 2:1:7). Subsequently, while the positive and negative electrode leads were partly inserted in the case, the opening of the case was sealed under vacuum, whereby lithium-ion secondary batteries of Examples 1 to 19 and Comparative Examples 1 to 5 each having a capacity of 2 Ah were completed.

Measurement of Impedance

Each of the above-mentioned lithium-ion secondary batteries was subjected to 10 cycles of charging and discharging with a current equivalent to 0.5 C and then charged to 3.8 V. Thereafter, its impedance (unit: mΩ) at 1 kHz was determined by an impedance analyzer (manufactured by Solartron). Table 2 lists the results. When the impedance value is less than 6.0 mΩ, the lithium-ion secondary battery can be said to have sufficiently low impedance.

Measurement of Shutdown Temperature and Evaluation of Heat Resistance

Each of the lithium-ion secondary batteries made as mentioned above was placed in a high-temperature bath. While measuring the impedance of the lithium-ion secondary battery, its temperature was raised to 200° C. at a heating rate of 2° C./min, and a shutdown temperature at which the impedance drastically increased and a meltdown temperature at which the impedance drastically decreased were determined, whereby the heat resistance was evaluated. Table 2 lists the results. In Comparative Example 1, a drastic impedance rise due to a shutdown occurred in the vicinity of 120° C. and then a drastic impedance drop due to a meltdown occurred in the vicinity of 160° C. In Examples 1 to 19, though shutdown temperatures may vary depending on levels, no drastic impedance drop was seen in any level up to 200° C., and the improvement of heat resistance was confirmed. The shutdown temperature is required to be at least 100° C. and is preferably 100 to 120° C.

TABLE 2

|  | Impedance [Ω] | Shutdown temp. [° C.] | Meltdown temp. |
|---|---|---|---|
| Example 1 | 4.2 | 112 | 200° C. or higher |
| Example 2 | 4.4 | 106 | 200° C. or higher |
| Example 3 | 3.9 | 113 | 200° C. or higher |

TABLE 2-continued

|  | Impedance [Ω] | Shutdown temp. [° C.] | Meltdown temp. |
|---|---|---|---|
| Example 4 | 4.8 | 120 | 200° C. or higher |
| Example 5 | 4.1 | 123 | 200° C. or higher |
| Example 6 | 4.3 | 125 | 200° C. or higher |
| Example 7 | 4.2 | 118 | 200° C. or higher |
| Example 8 | 4.3 | 116 | 200° C. or higher |
| Example 9 | 4.2 | 112 | 200° C. or higher |
| Example 10 | 4.4 | 110 | 200° C. or higher |
| Example 11 | 4.5 | 111 | 200° C. or higher |
| Example 12 | 4.4 | 109 | 200° C. or higher |
| Example 13 | 5.4 | 112 | 200° C. or higher |
| Example 14 | 5.2 | 109 | 200° C. or higher |
| Example 15 | 4.4 | 129 | 200° C. or higher |
| Example 16 | 4.6 | 116 | 200° C. or higher |
| Example 17 | 4.3 | 110 | 200° C. or higher |
| Example 18 | 4.5 | 108 | 200° C. or higher |
| Example 19 | 5.6 | 106 | 200° C. or higher |
| Comp. Ex. 1 | 7.0 | 120 | 160° C. |
| Comp. Ex. 2 | 6.5 | 120 | 200° C. or higher |
| Comp. Ex. 3 | 6.0 | 105 | 200° C. or higher |
| Comp. Ex. 4 | 7.2 | 160 | 200° C. or higher |
| Comp. Ex. 5 | 7.7 | 102 | 200° C. or higher |

What is claimed is:

1. A lithium-ion secondary battery separator having a porous structure formed by laminating a second polymer layer, a first polymer layer, and a second polymer layer in sequence; wherein
the second polymer layer has a melting point lower than that of the first polymer layer;
the second polymer layer has a first part formed on a side in contact with the first polymer layer and a second part formed on a side farther from the first polymer layer than is the first part;
the first part and the second part have a weight-average molecular weight ratio (first part/second part) of 4 to 19 therebetween;
a film of the second part is laminated on a film of the first part;
the second polymer layer is a layer constituted by at least one kind of polymer material selected from the group consisting of polyethylene and polypropylene; and
the first polymer layer is a layer constituted by at least one kind of polymer material selected from the group consisting of polyacrylonitrile, polyamide-imide, polyvinyl alcohol, and thermoplastic polyimide.

2. The lithium-ion secondary battery separator according to claim 1, wherein the second polymer layer and the first polymer layer have a film thickness ratio (second polymer layer/first polymer layer) of 0.1 to 1 therebetween.

3. The lithium-ion secondary battery separator according to claim 1, wherein the second part and the first part in the second polymer layer have a mass ratio (second part:first part) of 0.2:1.8 to 1.5:0.5 therebetween.

4. A lithium-ion secondary battery comprising the lithium-ion secondary battery separator according to claim 1.

5. The lithium-ion secondary battery separator according to claim 1, wherein the first part is a part constituted by polypropylene and the second part is a part constituted by polyethylene.

* * * * *